INVENTOR.
JAMES EDWARD FREEBORN

ATTORNEYS

Fig. 16

Dec. 3, 1963  J. E. FREEBORN  3,112,652
DRIVE MECHANISM FOR RECIPROCATING ELEMENTS AND
FOR A MOWER HAVING AN OSCILLATORY DRIVE
Filed July 10, 1961  8 Sheets-Sheet 7

INVENTOR.
JAMES EDWARD FREEBORN

BY *Fulwider, Mattingly*
*& Huntley*
ATTORNEYS

United States Patent Office 3,112,652
Patented Dec. 3, 1963

3,112,652
DRIVE MECHANISM FOR RECIPROCATING ELEMENTS AND FOR A MOWER HAVING AN OSCILLATORY DRIVE
James E. Freeborn, Nazeing, England
(303 E. D St., Yakima, Wash.)
Filed July 10, 1961, Ser. No. 146,030
30 Claims. (Cl. 74—44)
(Filed under Rule 47(b) and 35 U.S.C. 118)

This application is a continuation-in-part of Serial Number 625,076, filed November 29, 1956, now abandoned. The invention relates to improvements in driving mechanisms for reciprocating elements such as reciprocating knife-bar machines for mowing field crops such as wheat, and lawn grass, or for trimming hedges and the like. The embodiments disclosed herein may be actuated by any desirable sources of power but are in the form of attachments for use with common agricultural tractors or garden power units.

Heretofore, mowers have been limited as to speed of operation by vibration and related problems. Speed of advance of any knife-bar mower is restricted by the top feasible speed of reciprocation of the knife-bar or bars; otherwise the crop will not be cut properly. Speed of reciprocation, in turn, has heretofore been restricted in order to avoid excessive and uncontrolled inertia forces and related effects which can render the mower inoperative and disrupt it. At the very least, inordinate vibration accelerates wear and fatigue of parts and is objectionable to the operator.

One of the objects of this invention is to control and contain the inertia forces arising from rapid reciprocation of reciprocating elements, such as the knife-bars, thereby permitting high speed operation of, for example, a mower and hence faster mowing. Other objects include the elimination of lost motion among critical parts of the driving mechanism, the actuation of the knife-bars by pull only (never push), and reduction of friction between certain cooperating parts by substituting rolling for sliding action. An advantageous effect of the containment of the inertia forces is that the energy required for the cyclic acceleration and deceleration of the reciprocating elements is retained within the mechanism, so that after starting, the prime mover need supply energy only for the work load and to overcome frictional losses.

A comparison of the first and second embodiments disclosed herein reveals a further object of the invention. In the first embodiment, the rotary motion derived from the prime mover is converted to a reciprocating motion by a conventional crank and connecting-rod mechanism, whereas, in the second embodiment, the conversion is effected by a novel mechanism, denoted herein as an "oscillatory drive." Analysis shows that the crank and connecting-rod mechanism delivers a reciprocatory motion which is not a pure sine motion but contains, for practicable ratios of connecting-rod to crank lengths, a large harmonic content, mostly the second harmonic. This harmonic content is a source of unwanted vibration, which causes useless and harmful dissipation of a considerable percentage of the applied power. The oscillatory drive, on the other hand, provides a virtually pure sine motion, and thereby contributes substantially to achievement of the primary object of the invention.

The principal objects of the invention are accomplished as follows: The major inertia forces are controlled and contained by the joint application of three principles: balance, elastic transfer, and resonance. Referring to the reciprocating knife-bars, the energy required for their cyclic operation is alternately transferred to and from elastic energy storage means, herein shown as torsional, so matched to the mass and frequency of the moving parts that the action is resonant and therefore essentially conservative of energy. The two reciprocating elements, namely the knife-bars, reciprocate in phase opposition and in immediate proximity so that the transferred reactions to the rectilinear inertia forces of the one counterbalance those of the other, and virtually no rotary inertia torques are developed. While resonant operation is planned, operation sufficiently close to resonance will be partially effective.

Balance alone (as is depicted in the Wagner Patent No. 2,157,041 and others) is not sufficient, for then the acceleration-deceleration forces are not retained within the mower. Elastic transfer alone is not sufficient. Elastic transfer, balance, and resonance together are necessary to achieve the object sought. And it must be emphasized that substantially perfect resonance is a unique condition requiring that the spring rate of the elastic energy storage means be precisely tailored to match the operating mass and the selected frequency of operation. Thus, three elements are essential: (1) Wagner's balance; (2) springs such as those depicted in the Blood Patent No. 280,902; and most important (3) precisely tailoring the springs to match the mass and frequency so as to effect resonance.

The elimination of the lost motion among critical parts is effected by including the knife-bars and the immediately associated moving parts in a closed mechanical circuit which is pre-tensioned so that working joints are firmly seated. Friction is reduced in many places by using non-slipping rolling action as disclosed in co-pending application 808,804, filed April 24, 1959, now United States Patent No. 3,058,361, issued October 16, 1962.

Another unique feature of the invention is that each knife-bar is moved by pulling only, never by pushing as in the Wagner patent and other structures. This solely pulling action is achieved in part by the coupling mechanism at the outer ends of the knife-bars. It is insured by the one-way couplings or engaging biased abutments at all four knife-bar ends. A knife-bar is accelerated by pulling its leading end, and is decelerated by a pulling force at its trailing end. By virtue of this action, and in conjunction with the above-mentioned pre-tension of the closed circuit, each knife-bar is always tensioned and never compressed. This is especially important with high speed operation where the inertia forces are large. Compressive action, such as that disclosed in said Wagner patent, tends to bow the knife-bars so as to impair cutting and promote clogging. Tension, as disclosed herein, assists in keeping the knife-bars straight and in close proximity. And, moreover, as the knife-bars are under tension only, there is no strain reversal with its fatigue-inducing effects in these vital parts.

The elimination of second-harmonic vibration by the oscillatory drive is obtained essentially by separating the rotary input into two phases in quadrature, one phase being transmitted as a practically purse sine motion while the other is suppressed. This is done by utilizing the fact that a wide-thin plate or vane is quite flexible in one direction and virtually inflexible in another. As a bonus, the flexing plate acts to absorb and return at least a part of the energy of the suppressed phase, thereby reducing cross vibration.

The advantages will be apparent from the following description, reference being had to the accompanying drawings wherein preferred embodiments of the invention are illustrated.

Considering first the embodiment shown in FIGS. 1 to 17. There are three major sections of the device: (1) the base unit 5; (2) the carrier unit 6; and (3) the cutter bar unit 7. The base is seen best in FIGS. 1 and 2. It serves two purposes: (1) it hingedly connects the carrier to the tractor, so that the carrier is supported at its inner end but can be tilted up or down as required; and (2) it converts the rotation of the tractor's conventional power take-off into a reciprocation for the operation of the knife-bars.

Figure 1:
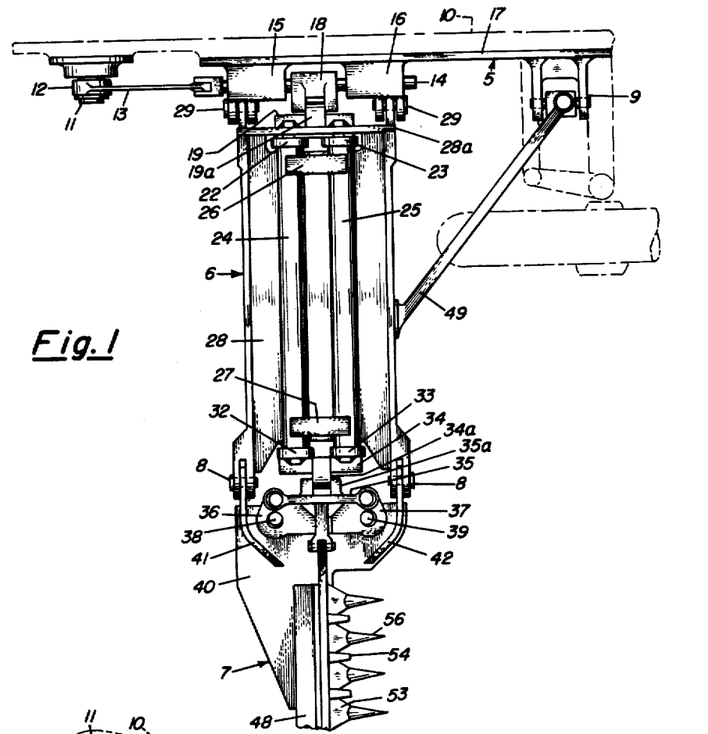
FIG. 1 is a fragmentary top plan view of the inner portion of the mower showing the same attached to a tractor, a fragment of the right side of the tractor being shown in phantom.
Figure 10:
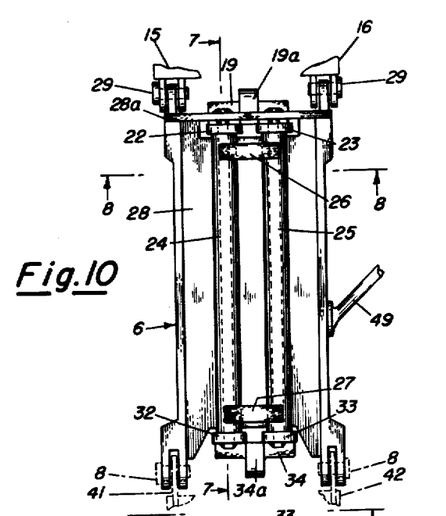
FIG. 10 is a top plan view of the mechanism which connects the cutter bar to the tractor mounting.
Figure 16:
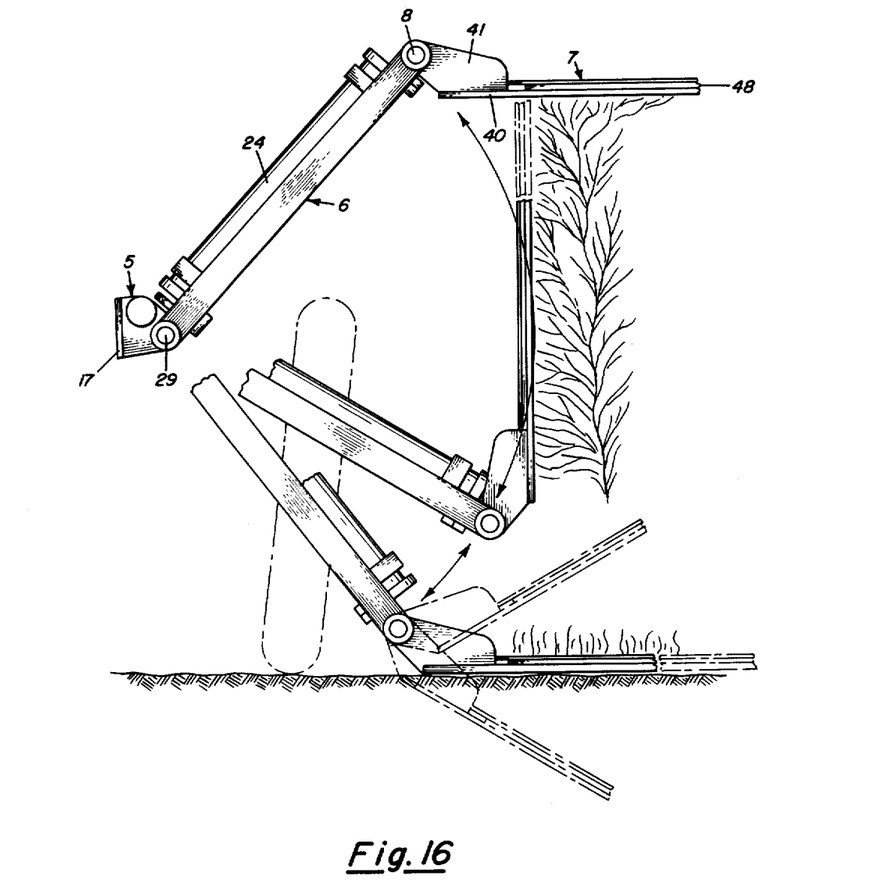
FIG. 16 is a fragmentary view in side elevation showing the cutter bar unit in various positions, to wit: The top view shows the position of the unit for trimming the top of a hedge; the intermediate view shows the position of the unit for cutting along a vertical line; and the lowest view shows the position of the unit when mowing a horizontal surface; the upper of the two dot and dash lines shows the position of the unit when mowing a surface which is inclined upwardly, and the lower of the two dot and dash lines shows the position of the unit when mowing a surface which is inclined downwardly.

The carrier 6 is seen in place in FIG. 1, by itself in FIG. 10, and its various positions are indicated in FIG. 16. It serves three purposes: (1) it hingdely supports the inner end of the cutter bar unit 7; (2) it transmits the sinusoidal motion developed in the base to the cutter bar unit; and (3) it provides elastic energy storage as required in the resonant operation of the mower. By interposing the carrier between the base and the cutter bar, it is possible to position the latter, as shown in FIG. 16, for a number of different types of jobs ranging from trimming the tops of hedges to mowing the weeds from the downward side of a drainage ditch. The positions of the carrier and cutter bar unit to conform to terrain are determined by a conventional hand or hydraulic lift rig which is not shown in the drawings.

The cutter bar unit serves six purposes: (1) it slidably supports and guides the twin knife-bars which are disposed along its length; (2) it carries spaced along its length, the many guards which serve to protect the knives and to steer the crop into them; (3) it supports at its outer end the crop divider which delimits the swath to be cut and which in turn supports the operating mechanism at the outer end of the cutter bar; (4) it couples the knife-bars at both their inner and outer ends, and links them in phase opposition to the sinusoidal motion; (5) it pre-tensions the closed mechanical circuit formed by the twin knife-bars and their inner and outer couplings; and (6) it provides elastic energy storage at its outer end as required in the resonant operation of the mower.

From the foregoing it is apparent that there are three major units or sections, each serving certain purposes, and together constituting a high speed mower.

Figure 2:
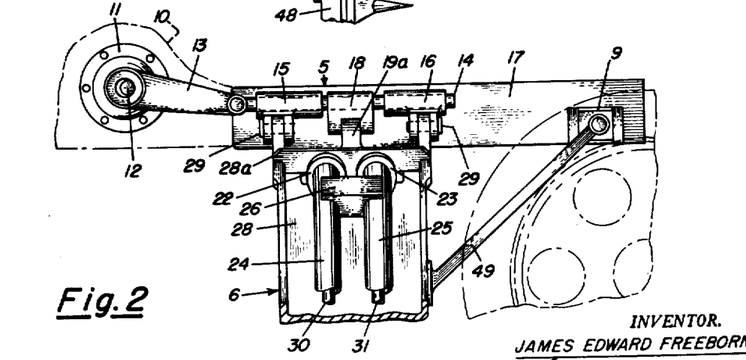
FIG. 2 is a fragmentary side view in elevation; the carrier is shown in a depressed position, the view including also a fragment, in phantom, of the right side of the tractor.

Referring to FIGS. 1 and 2, which show the base section 5, 10 represents the tractor body. The mower is shown as side-mounted just behind the right front wheel of the tractor so that the mowing can be observed by the operator. The base 5 includes a plate 17 which is secured to the tractor by mounting bolts (not shown). Cooperating hinge parts 29 are affixed to plate 17 and also to carrier 6 supporting the inner end of the carrier, whereby the carrier can be raised or lowered, as depicted in FIG. 16. The structure is strengthened by a diagonal brace 49 which is affixed to the carrier and hingedly connected to plate 17 by hinge 9. The pin axes of hinges 9 and 29 are necessarily collinear. This construction fulfills the first purpose of the base unit.

A rod 14 is slidably carried in sleeves 15 and 16 and these sleeves are also affixed to plate 17. Rod 14 is connected by connecting-rod 13 to crank or eccentric 12. This eccentric is mounted on shaft 11 which represents the conventional side power take-off of the tractor or drive means. Shaft 11 rotates at a pre-selected frequency to which the mower mechanism is matched. As shaft 11 rotates, the crank and connecting rod mechanism 12—13 causes rod 14 to reciprocate with an approximate sinusoidal motion for use in operating the knife-bars. A fork 18 is affixed to rod 14 and, of course, moves with it (left and right as seen in FIG. 1). This fulfills the second purpose of the base section.

Figure 8:
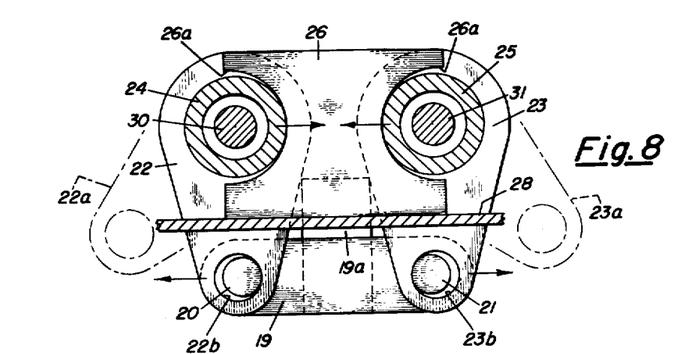
FIG. 8 is a sectional view taken along line 8—8 of FIG. 10, but on a larger scale.
Figure 9:
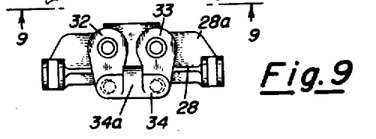
FIG. 9 is a view in elevation looking in the direction of arrows 9—9 of FIG. 10.

The carrier section 6 is shown as a whole in FIGS. 1 and 10, and appears in part in other figures. This unit is built on frame 28 which includes plate 28a. As seen in FIG. 1, one end of the carrier is pivotally connected with the base unit 5 by hinges 29, and hinges 8 at the other end of the carrier provide pivotal connections with the cutter bar unit 7. Thus, the carrier is hinged at its inner end to the base unit and at its outer end to the cutter bar unit. Also affixed to frame 28 are brackets 26 and 27, one of which is best seen in FIG. 8. These brackets are alike and have arcuate surfaces as indicated by 26a. These surfaces provide part of the support for rigid tubes 24 and 25 which extend from end to end of the carrier. Levers 22 and 23 are affixed, respectively, to the inner ends of tubes 24 and 25 and like levers 32 and 33 are affixed, respectively, to the outer ends of the tubes 24 and 25. Each lever 22 and 23, 32 and 33 is provided with a hole, such as that shown at 22b in lever 22 and 23b in lever 23.

The holes 22b and 23b in levers 22 and 23 receive pins 20 and 21, respectively, which are fixed parts of a link 19. Similarly, levers 32 and 33 are joined by link 34 which is a replica of link 19. Link 19 carries prong 19a and link 34 carries prong 34a. Temporarily ignoring the apparent loose fit of tubes 24 and 25 in brackets 26 and 27, and of the pins such as 20 in the holes such as 22b, it is apparent that when prong 19a is reciprocated (left and right as seen in FIG. 10), the assembly of the tubes and brackets, levers and links is such that prong 34a will duplicate the motion. But prong 19a is closely fitted between the tines of fork 18 and hence follows the reciprocation of rod 14. Similarly, prong 34a is closely fitted between the tines of a fork 35a which is part of link 35, an element of the cutter bar actuating mechanism. Thus, the reciprocation or sinusoidal motion of rod 14 is transmitted from the base to the cutter bar actuating mechanism as represented by link 35. This transmission takes place without any interference by motion of the carrier unit or cutter bar unit about the articulating hinges 29 between the base and carrier and hinges 8 between the carrier and cutter bar unit. This is so because the prong 19a and the cooperating tines of fork 18 are in line with hinges 29 and are not disengaged by the hinging motion. The same is true of the outer articulation between the carrier unit and the cutter bar unit, since the tines of fork 35a extend inwardly and the prong 34a extends outwardly beyond the axis of the hinges 8. Thus, the mechanism just described fulfills the second purpose of the carrier unit, and the sinusoidal motion is linked to the cutter bar unit mechanism. The matter of the apparent loose fits, which was temporarily ignored, will be discussed in connection with the achievement of the third purpose of the carrier unit, which follows.

The third purpose of the carrier unit 6 is to provide the inner elastic energy storage. This is done in the form of torsion rods 30 and 31. Consider rod 30. It is relatively slim along most of its length but has short portions at its opposite ends, 30a and 30b (FIG. 7) which are enlarged to approximately the internal diameter of tube 24. End 30a is welded to plate 28a and end 30b is welded to tube 24. On assembly, the weld at end 30a is made while both levers 22 and 32, which are parallel, are inclined as indicated by 22a for lever 22 in FIG. 8. After welding, levers 22 and 32 are rotated counterclockwise (as seen in FIG. 8) and the pins of links 19 and 34 are inserted in the lever holes, as shown for pin 20 in hole 22b. At the same time, of course, a similar operation is carried out for the corresponding parts 31, 23, 33, where the senses of the inclination and rotation are reversed. When the levers, 22 with 23 and 32 with 33 are rotated for the insertion of the pins of links 19 and 34, the torsion rods 30 and 31 oppose the rotations and so are put under initial torques or pre-stresses. These pre-stresses are sufficient, as determined by the inclinations of the levers during welding of rods 30 and 31 to plate 28a, so that during operation of the carrier mechanism the pre-stresses never drop to zero. Hence, the results are that tubes 24 and 25 are always firmly seated in brackets 26 and 27 by the action of the torques in rods 30 and 31, respectively. Also, the pins, such as 20, are always firmly seated in the holes such as 22b by the same torques. Thus, lost motion is eliminated at these sites or junctions, and the apparent loose fits noted previously are actually positive bearing actions, all due to the use of initial torques in rods 30 and 31.

When the mower is operating, links 19 and 34 are reciprocating (left and right as seen in FIG. 10), as was explained above. Consequently, levers 32 and 33 are oscillating angularly. When link 34 moves left of center, the torque in rod 31 is increased, while that in rod 30 is decreased, but the net force tending to return the link to center increases, and does so in direct proportion to the displacement of the link from center. A similar result occurs when link 34 moves to right of center. Thus, displacement of link 34 in either sense, from the central neutral position, shown in FIG. 8, is opposed by a force linearly proportional to the displacement and always tending to return the link to center where the net force is zero. This center corresponds to the central positions of the knife-bars. Moving link 34 away from center, against the force exerted by the torques in rods 30 and 31, results in storing energy in elastic form in these rods. The energy so stored is returned, with virtually no loss, as link 34 moves toward center. By means of the prong-fork relations of links 34 and 35, the inner elastic energy storage is linked to the inner coupling of the knife-bars. In this manner the carrier unit fulfills its third purpose.

Figures 3, 4, 5, 6:
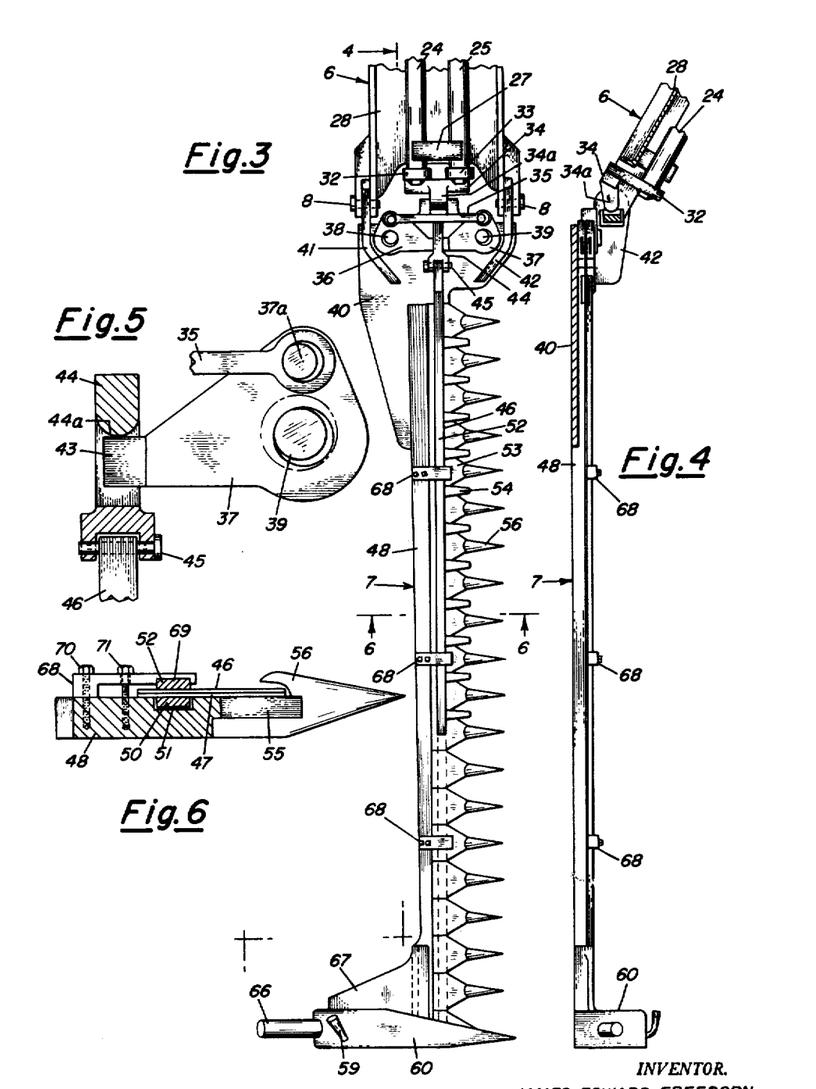
FIG. 3 is an extension of FIG. 1 showing the full cutter bar.
FIG. 4 is a side view of the structure shown in FIG. 3, part thereof being shown in section, the view being taken along the line 4—4 of FIG. 3.
FIG. 5 is a fragmentary detail view partly in section and on a larger scale, showing the bell-crank mechanism by which the inner end of a knife-bar is pulled.
FIG. 6 is a sectional view taken along line 6—6 of FIG. 3 but on a larger scale.
Figure 7:
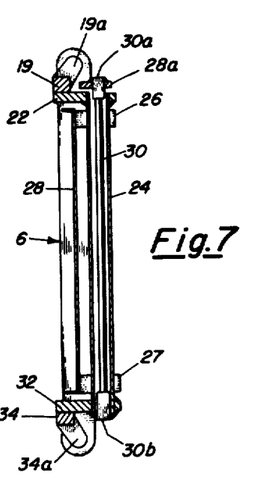
FIG. 7 is a sectional view taken along line 7—7 of FIG. 10, showing the carrier mechanism which connects the cutter bar to the tractor mounting.

Referring now to the cutter bar unit 7, which is seen as a whole in FIG. 3 and in part in other figures. It includes bar 48 which is affixed at its inner end to a plate 40. This plate has affixed to its webs 41 and 42 which form parts of hinges 8 by which the cutter bar unit is attached to the carrier unit 6. At the outer end of bar 48 are affixed a crop divider 60 and a bracing web 67. Projections 55 are formed integrally with and equally spaced along bar 48; these projections (FIGS. 6 and 11) partially support the leading edges of knives 53 and also provide the places for attachment thereto of shaped guards 56, which are individually replaceable (or may be omitted). The description so far covers the second and third purposes of the cutter bar unit.

Bar 48 is provided with a longitudinally extending slot 51 (FIG. 6). Freely slidable in this slot is bar 50 to which are affixed knives 53 of conventional shape to form the lower knife-bar denoted collectively by 47. Knife-bar 46 is similarly formed by knives 54 affixed to bar 52, and is supported by and slides upon the knives 53 of knife-bar 47 as seen in FIG. 6. It is guided by slots 69 in hold-down clips 68. Three such clips are shown in FIG. 3. Each clip is attached to bar 48 by bolt 70, and can be tightened downwardly by bolt 71 to press knife-bar 46 upon knife-bar 47, to insure close cutting action by the cooperating knives 53 and 54. The knives of the two knife-bars, and the guards on the cutter bar unit are all spaced equally, and the knives as seen in FIG. 3 are in their central positions. This construction satisfies the first purpose of the cutter bar unit. As the knife-bars reciprocate in phase opposition, the usual cutting action occurs.

The inner ends of knife-bars 46 and 47 are coupled by link 35, two similar bell-crank levers 36 and 37, and two similar end pieces 44. The assembly can be seen in FIG. 3, and the details for knife-bar 46 are shown in FIG. 5. The levers 36 and 37 swing with a rolling action around pins 38 and 39 which are affixed to plate 40. Pins 36a and 37a are parts of levers 36 and 37 and are connected by link 35; a rolling action takes place at these sites also. As seen in FIG. 5, for knife-bar 46, end piece 44 is joined to the knife-bar by a pin 45 and contains a slot in which the toe 43 of lever 37 operates. This slot is made deep enough so that toe 43 contacts only rounded surface 44a, the two being biased toward one another because of a pre-tension effect which is described hereinafter. Here, also a rolling action occurs between 43 and 44a. Since toe 43 contacts only surface 44a, lever 37 can exert only a pull on the knife-bar; any possibility of a push is precluded by the depth of the slot in piece 44. The assembly of parts just described has the effect that as link 35 reciprocates right and left as seen in FIG. 3, levers 36 and 37 alternately pull knife-bars 46 and 47 inward (upward as seen in FIGS. 3 and 5), thereby linking the knife-bars to the sinusoidal motion in phase opposition. This fulfills the inner part of the fourth purpose of the cutter bar unit.

Figures 11, 14, 15:
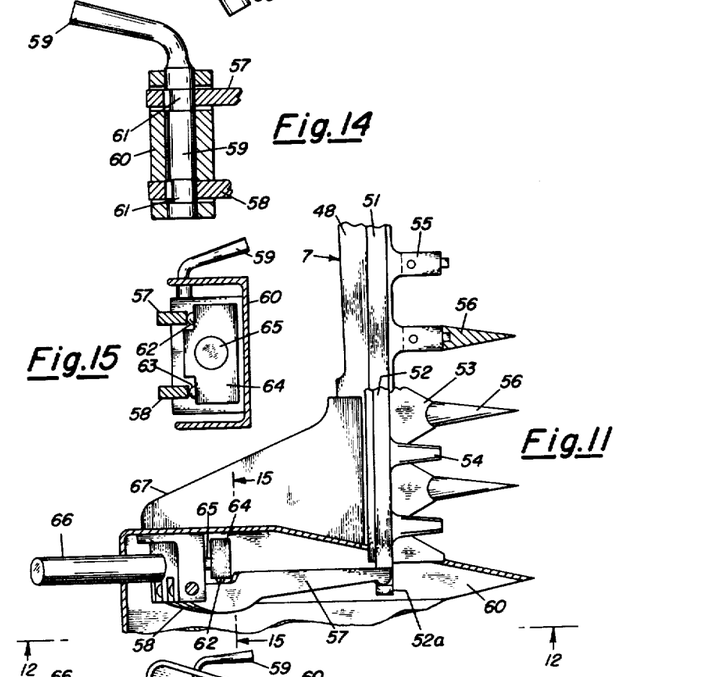
FIG. 11 is a fragmentary top plan view partly in section, of the outer end of the cutter bar, the crop divider being shown in section to illustrate the outer elastic energy storage means.
FIG. 14 is a sectional view of the tension adjusting means taken along line 14—14 of FIG. 13.
FIG. 15 is a sectional view taken substantially along line 15—15 of FIG. 11.
Figure 12:
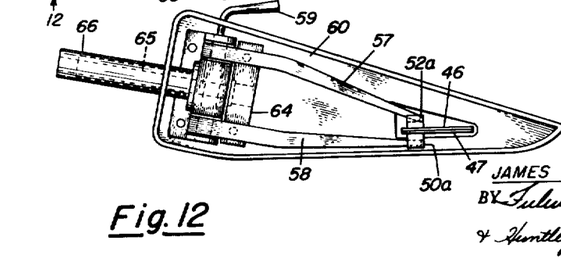
FIG. 12 is a side elevational view of the cutter bar mechanism looking in the direction of arrows 12—12 of FIG. 11, the cover of the crop divider being removed.

The coupling of the outer ends of the knife-bars is best seen in FIGS. 11 to 15. Each knife-bar terminates in a lug as shown at 52a on knife-bar 46, it being here formed on the end of bar 52. These lugs form abutments which are engaged by levers 57 and 58 for pulling the knife-bars. Levers 57 and 58 are pivoted on pin 59 which is rotatably mounted in a housing forming the crop divider 60. The levers are interconnected by the buttons 62 and 63 on a block 64 which block is fixed to a rod 65 (FIG. 15). As levers 57 and 58 oscillate in phase opposition in conjunction with knife-bars 46 and 47, block 64 oscillates about the axis of the rod 65. The result is that as one of the knife-bars is pulled inward (i.e., toward the tractor) by one of the levers 36 or 37, that knife-bar pulls on one of levers 57 or 58, for example lever 57, and by the action of block 64 and the other of said levers, for example lever 58, pulls the other knife-bar outwardly. In this way each knife-bar assists in moving the other knife-bar, and each of the knife-bars is moved by pulling actions only. This completes the fourth purpose of the cutter bar unit. Note that either at an inner end (levers 36 and 37) or at an outer end (levers 57 and 58), a knife-bar is not, and cannot be, pushed. The knife-bars are said to be dynamically equivalent when the product of the mass of one by the amplitude of its motion is equal to the same product for the other.

Figure 13:
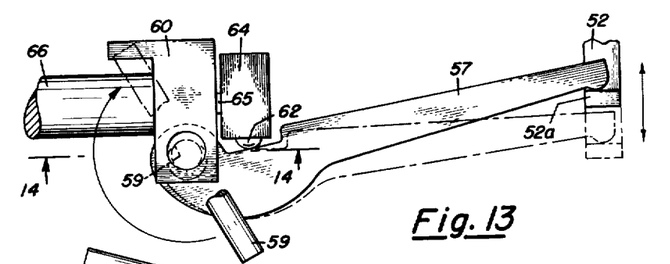
FIG. 13 is a top plan view of part of the knife-bar coupling means, but on a larger scale than that shown in FIG. 12.

The two knife-bars 46 and 47, together with the mechanisms which couple their inner and outer ends as just described form a closed mechanical circuit. This circuit is subjected to a manually effected pre-tension by turning the pin 59. This is so because surfaces 61 of the pin are eccentric as shown in FIGS. 13 and 14. The turning of pin 59 displaces the left ends of levers 57 and 58 as shown in FIG. 13. If the displacement is upward (as viewed in FIG. 13), the levers pivot about buttons 62 and 63 as fulcrums and their right ends exert pressure against the lugs 50a and 52a. Starting with pin 59 in its slack position, then turning it through a small angle commences the pressure, and increasing the angle, increases the pressure. This pressure is transmitted along knife-bars 46 and 47 and reaches the inner coupling parts. The result is that the entire loop or circuit between, and including, block 64 and link 35 is tightened or pre-tensioned. When pin 59 is turned sufficiently, the pre-tension insures that all the joints in the circuit are free of lost motion and knife-bars 46 and 47 are taut. This achieves the fifth purpose of the cutter bar unit.

The sixth purpose of the cutter bar unit 7 is to provide elastic energy storage at its outer end for resonant operation of the mower. This is accomplished through block 64 which is affixed to rod 65. Rod 65 is in turn affixed to tube 66 at their left ends, as viewed in FIG. 12, and the right end of tube 66 is affixed to the crop divider. The axes of rod 65 and tube 66, and the axis of turning of block 64, all coincide, while the dimensions of the rod and tube are such that together they form an elastic torsion member. As block 64 is oscillated by the alternate pulling action of knife-bars 46 and 47 on levers 57 and 58, respectively, (clockwise and counterclockwise as viewed in FIG. 15), it does so with and against the elastic torque of the rod 65-tube 66 torsion member. This torque increases linearly as block 64 turns in either sense form its neutral position as shown in FIG. 15, and the torsion member correspondingly stores energy. The energy is returned with virtually no loss as block 64 moves toward its neutral position (wihch corresponds to the central positions of the knife-bars).

Figures 17, 22, 23:
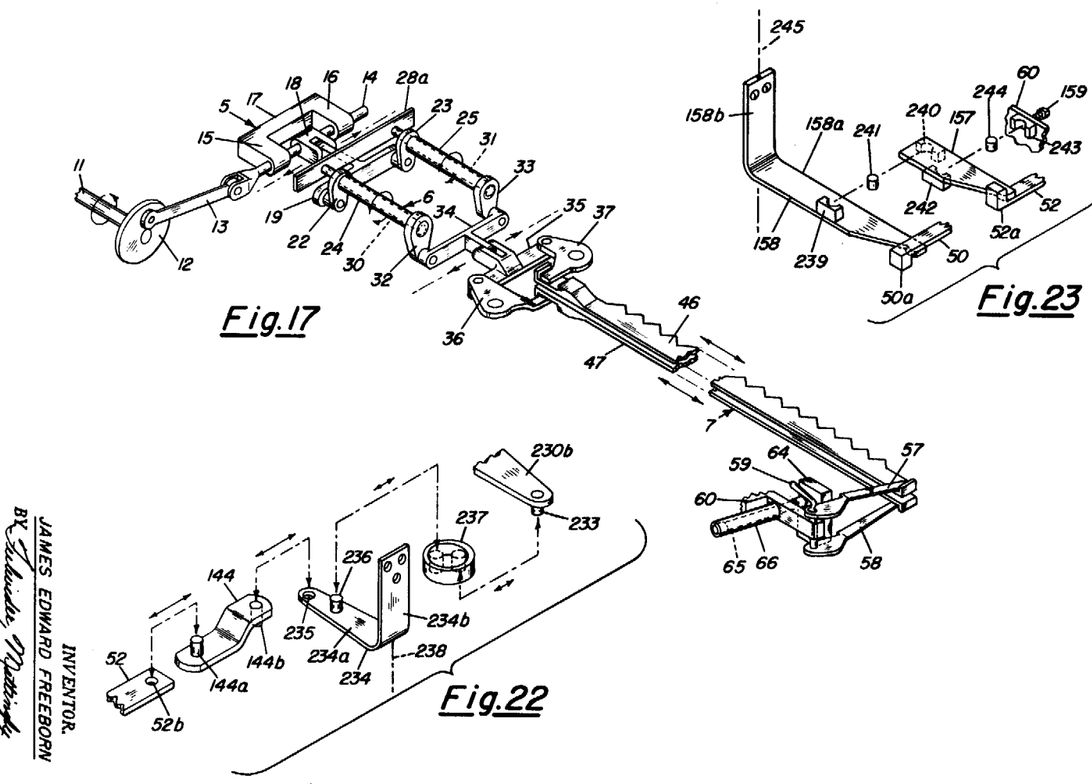
FIG. 17 is a partial schematic view illustrating the basic principles of the mechanism, some parts being simplified for clarity.
FIGS. 22 and 23 are exploded schematic views of parts of the mechanism illustrated in FIGS. 20 and 21.

The essential mechanisms by which the base unit 5 accomplishes its two purposes, the carrier 6 its three, and the cutter bar unit 7 its six have been described. Together they constitute the mower in its first form. Reference is now made to FIG. 17, which is a skeletonized view of the mechanism, where the parts and their relations are shown in a slightly simplified and schematic way for the sake of clarity.

Starting at power take-off shaft 11, it is apparent that in rotating it causes crank 12 and connecting-rod 13 to reciprocate rod 14 in an approximate sinusoidal motion. Rod 14 carries fork 18 with its tines embracing the prong of link 19, so link 19 follows the motion of rod 14, and does so regardless of any angular position of the carrier 6 with respect to the base 5. Link 19 connects levers 22 and 23 which are mounted on tubes 24 and 25, and therefore its reciprocation causes rocking of the tubes. Levers 32 and 33 are also mounted on rigid tubes 24 and 25, and thus duplicate the motions of levers 22 and 23. Levers 32 and 33 are connected by link 34, which consequently reproduces the motion of link 19, and hence of rod 14. Link 34 carries a prong which is embraced by the tines of the fork 35a carried by link 35, and thus link 35 itself reproduces the motion of rod 14, and does so regardless of any angular position of the cutter bar 7 with respect to the carrier 6.

Link 35 connects bell-crank levers 36 and 37 which transfer the reciprocation of link 35, turning it through right angles to alternately pull the inner ends of knife-bars 46 and 47 inwardly. The knife-bars are pulled outward by the mechanism at the outer end of the cutter bar. Here the lugs 50a and 52a of the knife-bars 46 and 47 are engaged by levers 57 and 58, which latter are coupled by block 64. As knife-bar 46 pulls the abutting end of lever 57 inwardly, block 64 is tilted thereby and forces lever 58 to pull knife-bar 47 outwardly. Conversely, when knife-bar 47 moves inwardly, lever 58 acting through block 64 and lever 57, pulls knife-bar 46 outwardly. Thus, at their outer ends, knife-bars 46 and 47 are always pulled and never pushed. It should be noted that the mechanism which is actuating the knife-bars so far described in this paragraph, does not use the elastic energy storage parts, or in other words, the knife-bar drive is positive and contains no flexible elements for the drive itself.

As tubes 24 and 25 are rocked, torsion rods 30 and 31 which are fixed at their ends to levers 32 and 33 and to plate 28a, elastically store and return energy. Also, as block 64 oscillates, the affixed torsional rod 65 and tube 66 absorb and restore energy. The spring rates of rods 30 and 31 and of the rod 65-tube 66 member are chosen to match the total reciprocating and oscillating mass (mostly the knife-bars) so that the free frequency of the elastic-and-mass system substantially equals the pre-selected operating frequency of shaft 11. In other words, the mower mechanism is operated resonantly. The cyclic energy flows back and forth between a kinetic form in the moving parts and a potential form in the stressed elastic parts. The inertia forces, developed in the accelerating and decelerating parts, are always opposite and equal to the forces exerted by or on the elastic parts.

Referring more particularly to the knife-bars 46 and 47 which are relatively the largest moving masses, as either of them is accelerated or decelerated, the inertia force which it exerts is necessarily opposed by an equal and opposite reaction of the cutter bar. Because there are two substantially dynamically equivalent knife-bars moving in phase opposition, the cutter bar reactions, due to the two of them, are opposed and cancel as rectilinear forces. Moreover, since the knife-bars are in close proximity, there are virtually no unbalanced inertial torques. If this condition of balance of inertial rectilinear forces and absence of inertial torques were not provided, the reactions of the cutter bar would be transferred to the tractor. However, with balance and resonant operation, substantially all cyclic forces are contained within the mower and high speed operation is feasible. Of course, all moving parts associated with the knife-bars, from rod 14 at the inner end out to and including block 64 at the outer end, contribute their inertia effects and must be considered in accurate design calculations.

It is to be noted that the elastic parts 30, 31, 65, and 66 are not essential to the operation of the mower at a low speed, provided rotary bearings are substituted for rolling contacts in certain places such as the brackets supporting tubes 24 and 25. With these substitutions made and the elastic parts omitted, the modified mechanism would still constitute a mower, but it would not be one capable of high speed operation. The elastic parts permit resonant operation which is one essential to high speed, but it should be understood that the elastic parts are not basic to the primary functions of the mower. On the other hand, it should be noted that when the resonated mower is idling (no work load) and frictional losses are absent, the power take-off could be disconnected after start-up and the mower would continue operating at its free frequency indefinitely, for the energy of cyclic motion is retained or conserved within the mower and is independent of the prime mover. In other mowers, of course, the cyclic energy is continuously derived from, and in part returned to, the prime mover on the tractor (causing vibration).

Having covered the operation of the mechanism, the features and advantages thereof will be pointed out. The three most important of these features are, of course: (1) the smooth transfer of the knife-bar inertia forces to the cutter bar by elastic means; (2) the balance of the oppositely phased knife-bars which provides for cancellation in the cutter bar of its reactions to the inertia forces; and (3) the precise matching of the spring rate of the elastic means to the amount of moving mass and to the operating frequency which insures that the cyclic energy is retained within the mower and is not transferred to and from the tractor. If any of these three effects is missing, the prime objective of the invention will not be achieved, i.e., there will be objectionable vibration and mowing speed will be sharply limited.

It has been pointed out that the knife-bars are operated by tensile forces only, an important effect in high speed operation where the inertia and other forces are large since they increase as the square of the speed. This factor opposes any tendency to bowing, and prevents strain reversal which would reduce fatigue endurance in these vital parts. To produce this effect, two things are desirable: (1) that each knife-bar assist in the actuation of the other, which implies the need for the outer as well as the inner coupling of the knife-bars; and (2) that the elastic storage means be provided in substantially dynamically equivalent parts at the inner and the outer ends of the knife-bars, which is not a mere multiplication of parts, but is essential to the dynamics of tension-only operation. Equal forces are required at the two ends of each knife-bar, and the storage means which provide them are said to be dynamically equivalent.

Pre-tensioning of the closed mechanical circuit of the knife-bars and their inner and outer couplings has two important results. One is that lost motion among the parts involved is prevented. The other is that it permits the use of rolling action in several places, to be distinguished from conventional rotary action with its sliding friction. Examples are tubes 24 and 25 rolling in brackets 26 and 27, and levers 36 and 37 rolling on pins 38 and 39. Moreover, the pretension insures that the contacts such as of lever 57 with lug 52a will remain firmly seated or biased despite any incidental lack of dynamic equivalence between the actions of the inner and outer elastic means.

The rolling actions which are used in lieu of conventional rotary bearings in several places not only: (1) reduce friction from that of sliding to that of rolling, but also (2) do not need, and should not have, lubrication; (3) can carry higher loads than conventional bearings of comparable size in this service; and (4) are simple and cheap to make and maintain.

The second embodiment of the high speed mower utilizes the same basic principles as the first, but there are differences in the specific applications of the principles. To shorten the description of the second embodiment the differences between it and the first embodiment will be emphasized rather than dwelling on the features which are the same or substantially the same. Where parts of the two embodiments are practically the same, the same numbers will be used to refer to them, and where a fairly close analogy exists, the old numbers will be used plus 100, otherwise numbers above 200 will be used. We refer now to FIGS. 18 to 23.

Unlike the first embodiment which has three sections or units, the second form has only two. The base unit 105 has three purposes: (1) to hingedly connect the cutter bar unit 107 to the tractor, permitting the cutter bar to be tilted upwardly or downwardly with respect to the base unit; (2) to raise or lower this axis of articulation relative to the ground (a function of carrier 6 in the first form); and (3) to transform the rotation of the tractor's power take-off into a reciprocation for actuating the knife-bars. The cutter bar unit 107 has the same six purposes as before, modified to the extent that the inner elastic energy storage, which was located on the carrier, is now located on the cutter bar unit.

Figure 18:
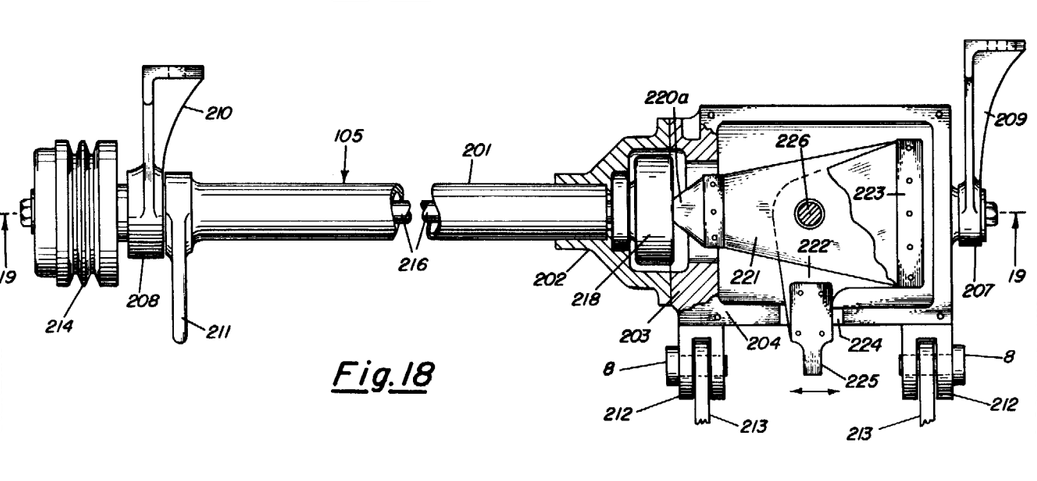
FIG. 18 is a top plan view, partly in section, illustrating another embodiment of the invention; the cover for the transmission housing is removed.
Figure 19:
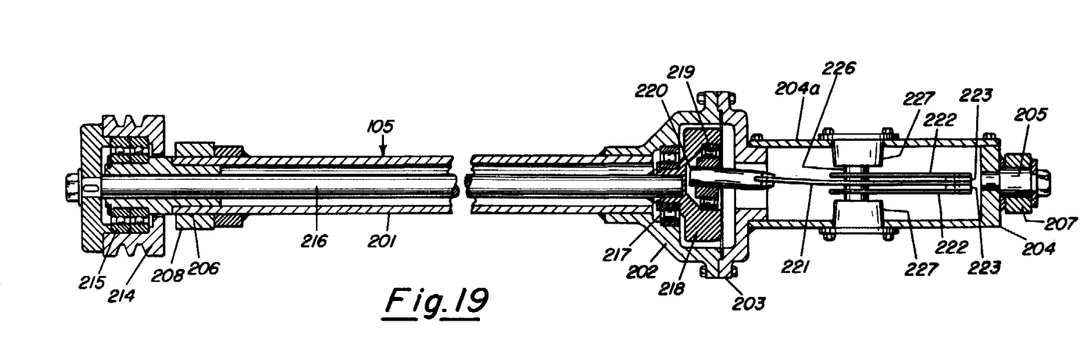
FIG. 19 is a sectional view taken along line 19—19 of FIG. 18 but shows some of the parts in elevation.

Referring now to FIGS. 18 and 19, instead of utilizing the tractor's side power take-off as before, the second embodiment is driven by the rear power take-off found on most agricultural tractors. The connection is conveniently made by conventional V-belts, and the take-off is required, as before, to produce a pre-selected frequency to which the mower mechanism is resonated. The base unit 105 includes tube 201 which extends horizontally along the side of the tractor in such a way that while its rear (left) end is abreast the rear power take-off, its front (right) end is located so that the operator can readily view the action of cutter bar unit 107.

A housing 202 is fixed concentrically with and to the forward end of tube 201. Bolted to the housing is concentric cover 203, to which is affixed rectangular casing 204 in symmetrical alignment with tube 201. Shaft 205 is aligned with the tube and is affixed to the forward (right) side of the casing. Journal surface 206 is disposed near the rear end of tube 201. Shaft 205 and journal 206 are rotatably mounted in bearings 207 and 208, respectively, which are parts of brackets 209 and 210, respectively. These brackets are bolted to the tractor (not indicated) and therefore the base unit 105 is so supported that it can be turned about its horizontal longitudinal axis. The turning is done by two levers, one of which is shown at 211. Lever 211 is affixed to tube 201 as shown, while a similar and parallel lever is affixed to cover 203 but is not seen due to the sectioning. These levers are operated by a conventional hand or hydraulic lift rig (not shown).

Affixed to casing 204 are hinge plates 212 which are connected to corresponding hinge plates 213 affixed to the cutter bar unit 107 by hinge pins 8. These two sets of collinear hinges support the inner end of the cutter bar unit and allow the cutter bar unit to be tilted (by the lift rig) with respect to the base unit. Thus, the first purpose of the base unit is served. As the hinges formed by plates 212 and 213 are on the axis of articulation of cutter bar unit 107 with respect to base unit 105, the turning of base unit 105 as described above raises or lowers this axis, and so accomplishes the second purpose of the base unit.

The third purpose of the base unit 105 is effected by a mechanism which is denoted as an "oscillatory drive." The rotational input to the oscillatory drive is derived from the power take-off by V-belts (not shown) running on pulley 214. This pulley is carried by bearings 215 which are mounted at the rear end of tube 201, and is attached by a bolt to the squared end of shaft 216 which consequently turns with the pulley. The shaft is concentric with tube 201 and is supported at its forward end by bearing 217 which is mounted in housing 202. A flywheel 218 is affixed to the forward end of shaft 216.

Flywheel 218 mounts within it a bearing 219 which is both slightly eccentric to the flywheel axis and has its own axis inclined relative to the axis of the flywheel by a small angle. There is preferred relation between the eccentric radius of bearing 219 and its inclination, which relation will be described below. Slidably inserted in this bearing is a cylindrical part of a coupling 220 which coupling fans out into a flat part 220a to which is affixed flexible vane 221. The right end of this vane is affixed between rigid drive plates 222 which are shaped somewhat like a boomerang. These plates are sufficiently separated by spacers 223 to avoid interference with vane 221 as it flexes during operation, and the vane has a central hole adequate to clear shaft 226. The lower ends of plates 222, as viewed in FIG. 18, protrude through an aperture 224 in a side of casing 204, and are rigidly joined to a tongue-shaped piece 225 which lies on the axis of the hinges 29 formed by plates 212 and 213.

Plates 222 are affixed to a shaft 226 which is rotatably mounted in bearings 227 supported by the bottom and the cover 204a of casing 204. Pulley 214 drives shaft 216 and thence flywheel 218. As the flywheel rotates, orbital movement is imparted to the coupling 220, causing the vane to undergo two motions. One motion is that of flexing, as best displayed in FIG. 19, as coupling 220 moves up and down due to its eccentric position in flywheel 218. The other motion is an oscillation, since the orbital movement of coupling 220 causes the assembly of vane 221 and plates 222 to pivot about the axis of shaft 226. The flexing motion goes no farther, although the elastic action stores and returns energy. The oscillation, however, results in tongue 225 performing a pure sinusoidal motion along the hinge axis, and is used for actuating the knife-bars. In this manner base unit 105 serves its third purpose.

The angle of inclination of the axis of bearing 219 with respect to the axis of flywheel 218 is preferably such that both spacers 223 and coupling part 220a are tangent to the curve of flexure of vane 221 when at maximum bending. This angle is twice the angle of spacers 223 subtended by the radial eccentricity at which vane 221 is affixed to flat 220a. Additionally it is to be noted that coupling 220 will slide slightly into and out of bearing 219 as vane 221 flattens and flexes during operation.

Figure 20:
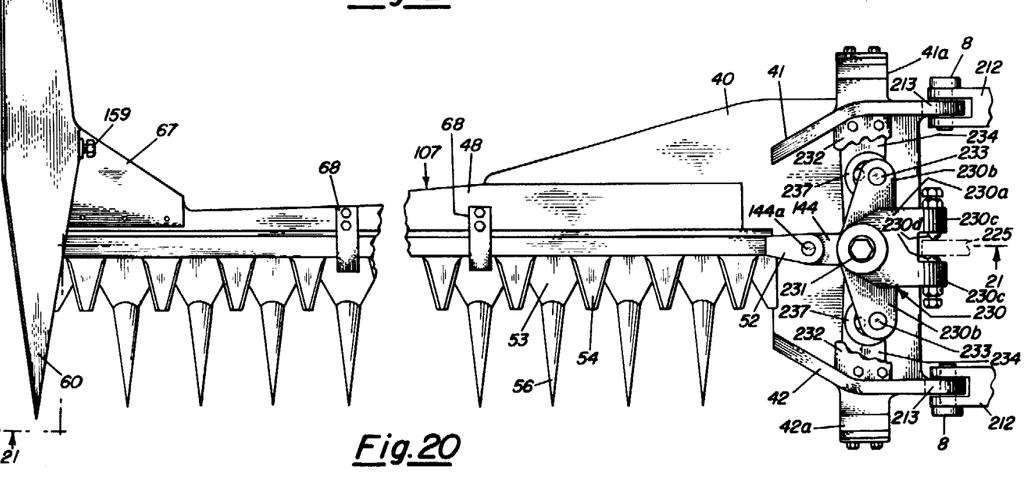
FIG. 20 is a top plan view of the cutter bar unit and parts of the mechanism for imparting reciprocating movements to the knife-bars, pertaining to the embodiment of FIGS. 18 and 19.
Figure 21:
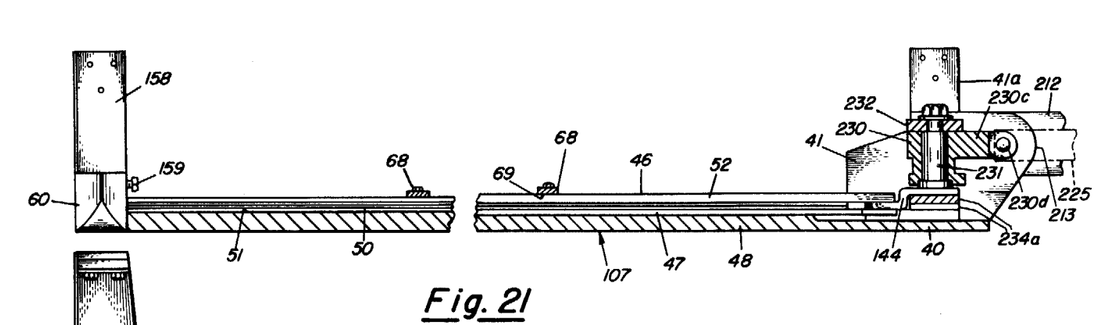
FIG. 21 is a front view of the cutter bar unit, partly in section, the section being taken substantially along line 21—21 of FIG. 20.

Referring to FIGS. 20 and 21, the cutter bar unit 107 has a general resemblance to unit 7 of the first embodiment. It includes bar 48 which is affixed at its inner (right) end to plate 40, to which in turn are affixed plates 41 and 42 whose right ends 213 are parts of the hinges joining the cutter bar unit 107 to base unit 105. At the outer (left) end of bar 48 are affixed crop divider 60 and bracing web 67. Lower knife-bar assembly 47 slides in a groove 51 in bar 48 and upper knife-bar assembly 46 slides upon 47 and is guided and pressed down by clips 68. Guards 56 are fastened to projections 55 of bar 48. Up to this point, which covers the first three purposes of the cutter bar unit, the two embodiments are very much alike, but the details to follow are different.

At the inner end of cutter bar unit 107 is rocker 230. This somewhat K-shaped part combines in one piece two portions, 230a and 230b, and is pivoted on pin 231 which is supported by bridge plate 232 bolted to plates 41 and 42. Portion 230a is a fork whose tines 230c embrace the tongue 225 of the base unit 105. Each tine is fitted with a spherically pointed bolt 230d (or a bolt with a ball at its tip) and these bolts are used to adjust the fit of the fit of the fork to the tongue. These bolts are on the axis of the hinges, so the tongue-fork pair transfers the reciprocation developed by the oscillatory drive through the articulation from the base unit to the cutter bar unit, i.e., the cutter bar mechanism is linked to the sinusoidal motion. Portion 230b is a two-ended lever to which are affixed at equal radii pins 233. These pins reciprocate in the direction needed by the knife-bars.

While pins 233 reciprocate in phase opposition with a virtually pure sinusoidal motion, the amplitude is less than required by the stroke of the knife-bars. The motion is amplified by a lever arrangement which, additionally, transfers the lines of motion from those of the pins to those of the knife-bars. The way this is done is depicted schematically in FIG. 22 for knife-bar 46 where the parts involved are represented separately for the sake of clarity. The manner of combining the parts by pins and holes is indicated by broken arrows and the relative amplitudes of motion are denoted by solid arrows. Starting at the left is bar 52 of knife-bar 46, having a hole 52b in which is placed pin 144a of end piece 144. Pin 144b, which is affixed to piece 144, is inserted in the hole 235 of lever 234a. Then pin 236 which is affixed to lever 234a, is coupled to pin 233, affixed to arm 230b of rocker 230, by a floating ring 237. It is to be noted that ring 237 has dual functions: (1) it serves as a one-way coupling or biased abutment between pins 233 and 236, which means that rocker 230 can only pull knife-bar 46 but never push it; and (2) it forms a double roll contact with pins 233 and 236, thereby reducing friction and avoiding lubrication as discussed earlier.

Knife-bar 74 is similarly connected to the other pin 233, and so the inner ends of the knife-bars are coupled to one another and linked to the sinusoidal motion, fulfilling the inner part of the fourth purpose of cutter bar unit 107. Lever 234a is a portion of part 234 which has a dual role; for the present lever 234a may be considered as though it were freely pivoted about axis 238 indicated in FIG. 22 (and, in fact, a physical pivot may be installed at this point, if desired). The remaining function of part 234 will be described later.

The coupling of the outer ends of the knife-bars has resemblances to, and differences from, the mechanism of the first form. It is illustrated schematically by a fragmentary view in FIG. 23. Here, lug 50a on bar 50 of (lower) knife-bar 47 is engaged by a rounded tip 158a, which is a portion of part 158. As at the inner end, part 158 has a dual role, but lever 158a temporarily may be considered as freely pivoted about indicated axis 245 (and, in fact, a physical pivot may be installed at this point, is desired). When lever 158a is pulled inwardly (right) by lug 50a on bar 50, partial bearing 239 moves in the same direction by half the amount of the bar movement, for it is affixed to the lever mid-way between its tip and axis 245. Partial bearing 239 pushes a roller 241 with it, and the roller in turn pushes with it a partial bearing 240 which is affixed to a lever 157. As the partial bearing 240 moves, lever 157 fulcrums on roller 244 between partial bearing 242, affixed to 157, and partial bearing 243 supported by the crop divider 60. This results in the rounded tip of lever 157 moving outward (left) and pulling bar 52 with it. However, the effective distance between the rounded tip of lever 157 and partial bearing 242 is twice that of the distance between this partial bearing 242 and partial bearing 240, so the movement of the tip doubles the movement of the other end, with the overall result that bars 50 and 52 move equal distances in opposite directions. (The reciprocal ratios, 1:2 and 2:1 of this description are not exclusive; other reciprocal pairs in this range would serve.) Of course, when bar 52 pulls inwardly, bar 50 is pulled outwardly, and so the outer ends of the knife-bars are coupled. Thus, the fourth purpose of unit 107 is completed.

In the mechanism of FIG. 23, partial bearing 243 is adjustable by bolt 159, and screwing the bolt leftwardly, pre-tensions the knife-bar-and-coupling closed circuit with the same effect as the corresponding action in the first embodiment. This satisfies the fifth purpose of unit 107. It is to be noted that the bearing surfaces of partial bearings 239 and 240 have diameters greater than that of roller 241, and a rolling action takes place as these parts move. The same is true with respect to partial bearings 242 and 243 with roller 244, and again common rotary action is replaced by rolling action.

The sixth purpose of cutter bar unit 107 is to furnish dynamically equivalent elastic energy storages at the inner and outer ends of the knife-bars. How this is done can be seen in FIGS. 22 and 23. The means are found in two parts 234 at the inner site and part 158 at the outer site, these parts being in the form of right-angled brackets, denoted as "torsional flats." Viewing FIG. 22, as lever 234a swings about axis 238, it torsionally flexes vertical portion 234b, which is anchored at its upper end to an extension 42a of plate 42 (lever 234a being stressed across its width, is virtually inflexible). The twisting and relieving of the two portions 234b absorbs and returns energy in the manner described with respect to rods 30 and 31 of the first form, and similarly portion 158b acts in lieu of the rod 65-tube 66 member, the displacement-force relation being linear and zero at mid-position. It is to be noted that in the second form, the inner elastic energy storage is in immediate proximity to the site of kinetic energy, namely the knife-bars, rather than being separated from it by an articulation, which second form is desirable. This completes the discussion of the six purposes of cutter bar unit 107.

As the tractor's rear power take-off or drive means turns the pulley 214 by V-belts (not shown), shaft 216 turns flywheel 218 at the pre-selected frequency. Flywheel 218 carries with it coupling 220 in orbital motion and thereby flexes and oscillates vane 221. The vane oscillation reciprocates tongue 225, which, through rocker 230, reciprocates pins 233 in phase opposition, and this action is not affected by the rotation of base unit 105 in its brackets nor the articulation of the cutter bar unit 107 with respect to the base, resulting from adapting the cutter bar unit to the terrain being mowed.

The sinusoidal motion of pins 233 is amplified and transmitted to knife-bars 46 and 47 by the lever action of torsional flats 234 which also absorb and release elastic energy. The inner ends of the knife-bars are pulled only by the action of pins 233, and rocker 230 couples them. At their outer ends, the knife-bars furnish the pulling action for one another and are coupled by the mechanism of FIG. 23 which also stores and returns elastic energy and pre-stresses the closed mechanical circuit of the knife-bars with their inner and outer couplings.

In short, the operation of the second embodiment is basically similar to that of the first one. Again, the inner and outer elastic energy storage means are dynamically equivalent and are precisely tailored to match the amount of moving mass to provide a free frequency equal to the pre-selected operating frequency. Rolling actions replace sliding rotary actions in several places.

The advantages cited for the first embodiment are generally applicable to the second. The reach of the articulations is not extensive enough for hedge tops in the dimensions shown, but it can obviously be extended; meanwhile it is simpler, for the intermediate carrier is omitted. Location of all elastic energy storage on the cutter bar unit is preferable. The torsional flats are simpler and cheaper to fabricate than their substitutes in the first form.

An outstanding advantage of the second form is in the oscillatory drive. As mentioned earlier, it completely avoids the second harmonic energy content which is unavoidable with any practical crank-connecting-rod motion. This unwanted energy component can amount to a considerable percentage of the useful energy, and contribute substantially to speed-limiting vibration. The oscillatory drive overcomes this in conformity with the overall objective of the invention.

The invention comprises a number of new and useful effects leading to an improved and efficient mower capable of high speed operation. The most important feature is the novel combination of three principles: (1) balance of inertial forces; (2) controlled transfer of inertial forces by elastic means; and (3) matching of the elastic means to the inertial forces, which forces are functions of the amount of moving mass, the length of the stroke, and the speed of motion. More specifically, this means: (1) twin knife-bars; (2) springs; and (3) resonance. No one of the three principles can be omitted if a virtually vibration-free mower is to be attained.

In this disclosure, the inertia forces of the knife-bars are exactly transferred to, and cancelled in, their support. There is no cyclic torque created in the drive shaft, as there is in Wagner's disclosure.

It has been noted that elastic energy storage must be supplied equally at the inner and outer ends of the knife-bars, and that when this is done, and in conjunction with pre-tensioning of the closed circuit described, the knife-bars are actuated by tension only (without fatigue-inducing strain reversal) so that they have no tendency to be bowed by compression, and the closed circuit is free of lost motion while its working junctions are firmly seated. It has also been pointed out, that in many places, rolling action replaces conventional rotary sliding action, thus reducing friction and wear and avoiding lubrication at these sites. The advantage of the pure sinusoidal motion delivered by the oscillatory drive in avoiding the second harmonic effect of a conventional crank-connecting-rod motion has been described.

While the forms of embodiments herein shown and described constitute preferred forms, it is to be understood that other forms may be adopted falling within the scope of the claims that follow.

I claim:

1. Driving mechanism for reciprocating elements such as the knife-bars of a mower, comprising in combination: two reciprocating elements having inner and outer ends; an inner coupling between the inner ends of said elements; an outer coupling between the outer ends of said elements, said elements and said couplings forming a closed mechanical circuit; adjustable means included in at least one of said couplings for pre-tensioning said circuit; biased abutments by which said couplings engage said elements and exert only pulling forces on said elements; and reciprocatory driving means linked to one of said couplings for reciprocating said elements in phase opposition.

2. Driving mechanism for reciprocating elements such as the knife-bars of a mower, comprising in combination: two reciprocating elements having inner and outer ends; an inner coupling between the inner ends of said elements; an outer coupling between the outer ends of said elements; at least one elastic energy storage means, with at least one of said couplings being linked to said elastic energy storage means; and reciprocatory driving means linked to one of said couplings for reciprocating said elements in phase opposition.

3. Driving mechanism for reciprocating elements such as the knife-bars of a mower, as defined in claim 2, in which said elastic energy storage means includes at least one torsional member.

4. Driving mechanism for reciprocating elements such as the knife-bars of a mower, as defined in claim 3, in which said torsional member is in the form of a rod.

5. Driving mechanism for reciprocating elements such as the knife-bars of a mower, as defined in claim 3, in which said torsional member is in the form of a right-angled bracket of which one leg is torsionally flexed while the other leg serves as a substantially rigid lever.

6. Driving mechanism for reciprocating elements such as knife-bars of a mower, comprising in combination: two dynamically equivalent reciprocating elements having inner and outer ends; an inner coupling between the inner ends of said elements; an inner elastic energy storage means, said inner coupling being linked to said inner elastic energy storage means; an outer coupling between the outer ends of said elements; an outer elastic energy storage means, said outer coupling being linked to said outer elastic energy storage means, said outer elastic energy storage means being substantially dynamically equivalent to said inner elastic energy storage means;

and reciprocatory driving means linked to one of said couplings for reciprocating said elements in phase opposition.

7. Driving mechanism for reciprocating elements such as the knife-bars of a mower, as defined in claim 6, in which each of said elastic energy storage means includes at least one torsional member.

8. Driving mechanism for reciprocating elements such as the knife-bars of a mower, as defined in claim 7, in which said torsional member is in the form of a rod.

9. Driving mechanism for reciprocating elements such as the knife-bars of a mower, as defined in claim 7, in which said torsional member is in the form of a right-angled bracket of which one leg is torsionally flexed while the other leg serves as a substantially rigid lever.

10. Driving mechanism for reciprocating elements such as the knife-bars of a mower, as defined in claim 2, in which said elastic energy storage means has its spring rate matched to the total mass of said elements and associated moving parts and to a pre-selected frequency of said driving means, so that the forces exerted by and on said elastic energy storage means are substantially and continuously equal and opposite to the inertial forces developed by said mass at said frequency.

11. Driving mechanism for reciprocating elements such as the knife-bars of a mower, as defined in claim 6, in which said inner and outer elastic energy storage means have their spring rates matched to the total mass of said elements and associated moving parts and to a pre-selected frequency of said driving means, so that the forces exerted by and on said inner and outer elastic energy storage means are substantially and continuously equal and opposite to the inertial forces developed by said mass at said frequency.

12. Driving mechanism for reciprocating elements such as the knife-bars of a mower, as defined in claim 2, in which said elastic energy storage means has its spring rate matched to the total mass of said elements, said inner and outer couplings, and the linkage between said driving means and one of said couplings, so that said elastic energy storage means and said mass form a system having a free frequency substantially equal to a pre-selected frequency of said driving means.

13. Driving mechanism for reciprocating elements such as the knife-bars of a mower, as defined in claim 6, in which said elastic energy storage means have their spring rates matched to the total mass of said elements, said inner and outer couplings, and the linkage between said driving means and one of said couplings, so that said elastic energy storage means and said mass form a system having a free frequency substantially equal to a pre-selected frequency of said driving means.

14. Driving mechanism for reciprocating elements such as knife-bars of a mower, as defined in claim 2, in which said elastic energy storage means has its spring rate matched to the total mass of said elements and associated moving parts, and to a pre-selected frequency of said driving means, so that the cyclic energy of reciprocation of said mass is substantially conserved in the system formed by said mass and said elastic energy storage means.

15. Driving mechanism for reciprocating elements such as knife-bars of a mower, as defined in claim 6, in which said elastic energy storage means has its spring rate matched to the total mass of said elements and associated moving parts, and to a pre-selected frequency of said driving means, so that the cyclic energy of reciprocation of said mass is substantially conserved in the system formed by said mass and said elastic energy storage means.

16. Driving mechanism for reciprocating elements such as the knife-bars of a mower, comprising in combination: two substantially dynamically equivalent reciprocating elements; a coupling between said elements; a reciprocatory driving means linked to said coupling for reciprocating said elements in phase opposition; and at least one elastic energy storage means linked to at least one of said elements, said elastic energy storage means having its spring rate matched to the total mass of said elements and associated moving parts, and to a pre-selected frequency of said driving means so that the forces exerted by and on said elastic energy storage means are substantially and continuously equal and opposite to the inertial forces developed by said mass at said frequency.

17. Driving mechanism for reciprocating elements such as the knife-bars of a mower, comprising in combination: two substantially dynamically equivalent reciprocating elements; a coupling between said elements; a reciprocatory driving means linked to said coupling for reciprocating said elements in phase opposition; and at least one elastic energy storage means linked to at least one of said elements, said elastic energy storage means having its spring rate matched to the total mass of said elements, said coupling and the linkage between said driving means and said coupling, so that said elastic energy storage means and said mass form a system having a free frequency substantially equal to a pre-selected frequency of said driving means.

18. Driving mechanism for reciprocating elements such as the knife-bars of a mower, comprising in combination: two substantially dynamically equivalent reciprocating elements; a coupling between said elements; a reciprocatory driving means linked to said coupling for reciprocating said elements in phase opposition; and at least one elastic energy storage means linked to at least one of said elements, said elastic energy storage means having its spring rate matched to the total mass of said elements and associated moving parts, and to a pre-selected frequency of said driving means so that the cyclic energy of reciprocation of said mass is substantially conserved in the system formed by said mass and said elastic energy storage means.

19. In combination, two reciprocating elements such as knife-bars for a mower; mechanism for reciprocating said elements in phase opposition to one another comprising: two abutments on each of the elements; elastic energy storage means engaging one of the abutments of one of the elements and a like abutment of the other of said elements, said elastic energy storage means yieldingly resisting movements of said elements in one direction; elastic energy storage means engaging the other like abutments of the elements, the second mentioned elastic energy storage means yieldingly resisting movement of said elements in a direction opposite the said one direction; and driving means linked to said elements for imparting reciprocating movement to said elements in phase opposition to one another.

20. The combination as defined in claim 19 in which the abutments are disposed adjacent the ends of the elements, respectively, and the abutments of the respective elements have surfaces confronting one another and the resisting forces exerted by the elastic energy storage means are applied to the confronting surfaces of the abutments.

21. In combination, two reciprocating elements such as knife-bars for a mower; mechanism for reciprocating said elements in phase opposition to one another comprising: two abutments on each of the elements; a coupling for like ends of the elements including means abutting one of the abutments of one of the elements and means abutting the like abutment of the other element, elastic energy storage means disposd to yieldingly resist movement of the first mentioned means in one direction, elastic energy storage means disposed to yieldingly resist movement of the second mentioned means in the said one direction; a second coupling for the opposite ends of said elements including elastic energy storage means engaging the other like abutments of the elements, the third mentioned elastic energy storage means yieldingly resisting movement of said elements in a direction opposite the said one direction; and driving means operating through one of said couplings for imparting reciprocating movement to said elements in phase opposition to one another.

22. The combination as defined in claim 21, in which the driving means is through the first mentioned coupling.

23. The combination as defined in claim 21 in which the abutments are disposed adjacent the ends of the elements, respectively, and the abutments of the respective elements have surfaces confronting one another and the resisting forces exerted by the elastic energy storage means are applied to the confronting surfaces of the abutments.

24. The combination as defined in claim 22 in which the abutments are disposed adjacent the ends of the elements, respectively, and the abutments of the respective elements have surfaces confronting one another and the resisting forces exerted by the elastic energy storage means are applied to the confronting surfaces of the abutments.

25. Driving mechanism for reciprocating elements such as the knife-bars of a mower, comprising in combination: two reciprocating elements having inner and outer ends; an inner coupling between the inner ends of said elements; an outer coupling between the outer ends of said elements; and reciprocatory driving means linked to one of said couplings for reciprocating said elements in phase opposition, said reciprocatory driving means comprising in combination: a coupling member; means for imparting an orbital motion to said coupling member; a driven member including a shaft oscillatable about an axis intersecting and normal to the axis of said orbital motion; at least one rigid plate affixed normally to said shaft, said plate having an attached tongue disposed radially to said shaft; and a flexible vane connecting said coupling member and said plate so that one phase of said orbital motion is suppressed in flexing said vane while the phase of said orbital motion in quadrature to the first-mentioned phase causes said driven member to oscillate and said tongue to perform a substantially pure sinusoidal motion.

26. A mower having a driving mechanism as defined in claim 16, in which the reciprocatory driving means comprises in combination: means for imparting an orbital motion to a coupling member; a driven member including a shaft oscillatable about an axis intersecting and normal to the axis of said orbital motion; at least one rigid plate affixed normally to said shaft, said plate having an attached tongue disposed radially to said shaft; and a flexible vane connecting said coupling member and said plate so that one phase of said orbital motion is suppressed in flexing said vane while the phase of said orbital motion in quadrature to the first-mentioned phase causes said driven member to oscillate and said tongue to perform a substantially pure sinusoidal motion.

27. A mower having a driving mechanism as defined in claim 25, in which the vane is flexible as to an axis lying substantially in its surface but is substantially rigid as to an axis substantially normal to said surface to separate a rotary motion into two phases in quadrature, one of said phases being suppressed in flexing said vane while the other of said phases is transmitted as a substantially pure sinusoidal motion.

28. A mower having a driving mechanism as defined in claim 26, in which the vane is flexible as to an axis lying substantially in its surface but is substantially rigid as to an axis substantially normal to said surface to separate a rotary motion into two phases in quadrature, one of said phases being suppressed in flexing said vane while the other of said phases is transmitted as a substantially pure sinusoidal motion.

29. Driving mechanism for reciprocating elements such as the knife-bars of a mower, comprising in combination: two reciprocating elements having inner and outer ends; an inner coupling between the inner ends of said elements; an outer coupling between the outer ends of said elements; reciprocatory driving means linked to one of said couplings for reciprocating said elements in phase opposition, said reciprocatory driving means comprises a flexible vane; means for imparting orbital movement to one end of the vane; a shaft disposed substantially transversely of the vane; and a driven member oscillatable about the axis of the shaft and connected with the other end of the vane.

30. A mower having driving mechanism as defined in claim 16, in which the reciprocatory driving means comprises a flexible vane; means for imparting orbital movement to one end of the vane; a shaft disposed substantially transversely of the vane; and a driven member oscillatable about the axis of the shaft and connected with the other end of the vane.

References Cited in the file of this patent

UNITED STATES PATENTS

| | | |
|---|---|---|
| 29,698 | Irwin | Aug. 21, 1860 |
| 280,902 | Blood | July 10, 1883 |
| 1,805,840 | Stone | Jan. 31, 1933 |
| 2,139,927 | Bane | Dec. 13, 1938 |
| 2,438,432 | Edwards | Mar. 23, 1948 |
| 2,573,068 | Scharf | Oct. 30, 1951 |
| 2,621,521 | Lewis et al. | Dec. 16, 1952 |
| 2,694,319 | Johnson | Nov. 16, 1954 |

OTHER REFERENCES

"Power thrust linkages and their applications," Product Engineering, June 1942. McGraw-Hill Publication Co., New York, N.Y., vol. 13, No. 6, pages 326, 327, TJ1, p. 93.

UNITED STATES PATENT OFFICE
CERTIFICATE OF CORRECTION

Patent No. 3,112,652                                                December 3, 1963

James E. Freeborn

It is hereby certified that error appears in the above numbered patent requiring correction and that the said Letters Patent should read as corrected below.

In the grant, lines 1 to 3, for "James E. Freeborn, of Nazeing, England," read -- James E. Freeborn, of Nazeing, England, assignor to Resonated Products, Inc., of Yakima, Washington, a corporation of Washington, --; line 12, for "James E. Freeborn, his heirs" read -- Resonated Products, Inc., its successors --; in the heading to the printed specification, lines 5 and 6, for "James E. Freeborn, Nazeing, England (303 E. D St., Yakima, Wash.)" read -- James E. Freeborn, Mazeing, England, assignor to Resonated Products, Inc., Yakima, Wash., a corporation of Washington --; column 2, line 56, for "purse" read -- pure --; line 58, for "wide-thin" read -- wide, thin --; column 11, line 1, after "is" insert -- a --; line 64, strike out "fit of the"; column 12, line 20, for "74" read -- 47 --.

Signed and sealed this 19th day of May 1964.

(SEAL)
Attest:

ERNEST W. SWIDER                                                   EDWARD J. BRENNER
Attesting Officer                                                Commissioner of Patents